United States Patent
Chen et al.

(10) Patent No.: US 10,746,151 B2
(45) Date of Patent: Aug. 18, 2020

(54) VEHICLE CHARGE CONTROL FOR PROTECTION AGAINST COLD CRANK FAILURE

(71) Applicant: Ford Global Technologies, LLC, Dearborn, MI (US)

(72) Inventors: Hanyang B. Chen, Canton, MI (US); Michael J. Irby, Monroe, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 222 days.

(21) Appl. No.: 15/925,269

(22) Filed: Mar. 19, 2018

(65) Prior Publication Data
US 2019/0285041 A1    Sep. 19, 2019

(51) Int. Cl.
*F02N 11/08* (2006.01)
*F02N 11/10* (2006.01)
*H02J 7/14* (2006.01)

(52) U.S. Cl.
CPC ...... *F02N 11/0862* (2013.01); *F02N 11/0859* (2013.01); *F02N 11/108* (2013.01); *H02J 7/1446* (2013.01); *F02N 2200/023* (2013.01); *F02N 2200/045* (2013.01); *F02N 2200/046* (2013.01); *F02N 2200/061* (2013.01); *F02N 2200/062* (2013.01); *F02N 2200/063* (2013.01); *F02N 2200/064* (2013.01)

(58) Field of Classification Search
CPC ............ F02N 11/0862; F02N 11/0859; F02N 11/108; F02N 2200/045; F02N 2200/064; F02N 2200/063; F02N 2200/062; F02N 2200/046; F02N 2200/061; F02N 2200/023; H02J 7/1446; H02J 7/0077; B60L 53/00

See application file for complete search history.

(56) References Cited

U.S. PATENT DOCUMENTS

| | | | | |
|---|---|---|---|---|
| 6,469,512 B2 * | 10/2002 | Singh | ........... | G01R 31/392 324/426 |
| 6,630,813 B2 * | 10/2003 | Berels | ........... | H02J 1/14 320/132 |
| 6,805,090 B2 | 10/2004 | Bertness et al. | | |
| 6,885,167 B2 * | 4/2005 | Palanisamy | ........ | G01R 31/3647 320/104 |
| 7,619,417 B2 * | 11/2009 | Klang | ........... | G01R 31/3648 324/427 |
| 7,642,787 B2 * | 1/2010 | Bertness | ........ | G01R 31/3648 324/426 |
| 7,688,074 B2 * | 3/2010 | Cox | ........... | B60W 20/12 324/426 |
| 7,743,649 B1 | 6/2010 | Salman et al. | | |
| 7,986,055 B2 * | 7/2011 | Owens | ........... | H02J 9/002 307/10.7 |

(Continued)

FOREIGN PATENT DOCUMENTS

DE     102014203417 A1    8/2015

*Primary Examiner* — Freddie Kirkland, III
(74) *Attorney, Agent, or Firm* — Frank Lollo; Eversheds Sutherland (US) LLP (57) ABSTRACT

Methods and apparatus are disclosed for vehicle charge control for protection against cold crank failure. An example vehicle includes a battery and a body control module. The body control module is to obtain state of charge information of the battery, obtain temperature information, and estimate a next crank time based on the state of charge information and the temperature information.

19 Claims, 4 Drawing Sheets

(56) References Cited

U.S. PATENT DOCUMENTS

| | | | |
|---|---|---|---|
| 8,924,043 B2 | 12/2014 | Maslyn et al. | |
| 9,784,229 B2 | 10/2017 | Holub et al. | |
| 2003/0169018 A1* | 9/2003 | Berels | H02J 1/14 320/132 |
| 2004/0239332 A1* | 12/2004 | MacKel | F02N 11/10 324/426 |
| 2005/0024061 A1* | 2/2005 | Cox | B60W 20/12 324/426 |
| 2005/0182536 A1* | 8/2005 | Doyle | G01R 31/3647 701/31.4 |
| 2007/0090844 A1* | 4/2007 | Klang | G01R 31/3648 324/426 |
| 2009/0184578 A1* | 7/2009 | Owens | H02J 1/14 307/10.7 |

* cited by examiner

VEHICLE CHARGE CONTROL FOR PROTECTION AGAINST COLD CRANK FAILURE

TECHNICAL FIELD

The present disclosure generally relates to vehicle batteries and, more specifically, to vehicle charge control for protection against cold crank failure.

BACKGROUND

Typically, vehicles include an engine that propels the vehicle, a starter motor (sometimes referred to as an electric motor) to start the engine, and a battery to support the starter motor. To successfully start the engine of the vehicle within an adequate cranking time, the battery should supply an adequate amount of power to the starter motor.

SUMMARY

The appended claims define this application. The present disclosure summarizes aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of this application.

Example embodiments are shown for vehicle charge control for protection against cold crank failure. An example vehicle includes a battery and a body control module. The body control module is to obtain state of charge information of the battery, obtain temperature information, and estimate a next crank time based on the state of charge information and the temperature information.

An example disclosed method for qualifying a next cold crank of a vehicle includes obtaining, from a battery sensor, state of charge information from a battery of the vehicle, and obtaining, by a processor, temperature information associated with the vehicle. The example method also includes estimating, by the processor, a next crank time of the vehicle based on the state of charge information and the temperature information.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

Typically, vehicles include an engine that propels the vehicle and an energy source that provides energy to the engine to propel the vehicle. Some conventional vehicles use a 12-volt lead acid battery to start the engine of the vehicle (e.g., crank the engine) and to provide electric power for electrical devices in vehicles. With low battery state of charge (SOC), the battery may fail to crank the engine, or the vehicle may have a slow crank. Slow or failed cranks may also be caused by other factors such as, for example, low battery temperature, an aged battery with sulfation (e.g., a loss of active material on battery plates, loss of electrolyte, shorted cell, etc.), aged electrical harness or joints that connect the battery and a starter motor of the vehicle, an aged starter motor (e.g., a worn brush, degraded permanent magnet, etc.), an aged engine or motor, etc. Failed and/or slow crank times can be problematic for the driver. As used herein, a "cold crank" refers to a crank when a temperature of the battery and a temperature of the engine or motor are substantially the same. For example, a cold crank may occur after a period while the vehicle is in an off state.

Examples disclosed herein include vehicles that determine potential scenarios for possible cold crank failure and protect against possible cold crank failure by estimating a next cold crank time based on battery SOC information and temperature information.

Example vehicles disclosed herein include a battery and a body control module. The body control module obtains battery SOC information related to the battery via, for example, a battery sensor that monitors characteristics (e.g., a current, a voltage, a charge level, a temperature and/or other characteristics) of the battery. As used herein, a "charge level" and a "state of charge" of a battery refer to a measurement of an amount of energy stored within a battery. In some examples, the body control module uses an adjusted battery SOC to control for battery drain that may occur while the vehicle is in an off state. The example body control module may adjust the battery SOC based on a quantity (e.g., 1% per day, etc.). For example, the body control module may determine an average key-off load for the vehicle over a period (e.g., since the last cold crank, etc.) and adjust the battery SOC based on the average key-off load. As used herein, a "key-off load" refers to a current drain on the battery while the ignition key is in the off position.

The example body control module also obtains temperature information. In some examples, the body control module obtains the temperature information from the battery sensor and/or a temperature sensor that measure ambient air temperature of (or around) the vehicle. In some examples, the body control module records ambient air temperatures over a threshold period (e.g., over a running period of two days). In some such examples, the body control module selects one of the stored ambient air temperatures. For example, the body control module may identify the lowest recorded ambient air temperature to select. In some examples, the body control module obtains weather forecasts for a threshold period (e.g., for the next seven days). In some such examples, the body control module selects one of the predicted ambient air temperatures included in the obtained weather forecasts. For example, the body control module may identify the lowest predicted ambient air temperature to select.

In general, lead-acid batteries (and other types of batteries) have reduced engine cranking capabilities when a temperature of the battery is relatively low. That is, as the temperature of the battery decreases, the ability of the battery to crank the engine of the vehicle in a timely manner is reduced. As a result, it generally takes a relatively longer time to crank the engine in relatively lower temperatures.

To estimate the next cold crank time, the example body control module applies the obtained battery SOC and the obtained temperature to a data table. The example data table relates battery SOC (in percentages) and temperatures (in Celsius) to estimated cold crank times (duration in milliseconds). As used herein, a "crank time" refers to a duration (in milliseconds) that it takes to start the engine of the vehicle. As used herein, a "cold crank time" refers to the crank time of the battery when a temperature of the battery and a temperature of the engine are substantially the same.

In some examples, the body control module qualifies the estimated next cold crank time based on a comparison to thresholds. For examples, the body control module may compare the estimated next cold crank time to a failure crank threshold (e.g., 2000 milliseconds) and determine whether to qualify the estimated next crank time as a failed crank based on the comparison. In some examples, if the estimated next crank time does not qualify as a failed crank, the body control module may compare the estimated next crank time to a fast crank threshold (e.g., 1000 milliseconds) to determine whether to qualify the estimated next crank time as a fast crank or a slow crank.

In some examples, responsive to a determination that the estimated next crank time qualifies as a failed crank or a slow crank, the body control module may implement measures to increase the charge level of the battery. For example, the body control module may disable (e.g., temporarily disable) features of the vehicle that draw electrical power from the battery. For example, the body control module may disable a Smart-Regen-Charging (SRC) mode of the vehicle, may disable a start-stop mode of the vehicle, may disable heated seats and/or windows, etc. The body control module may also enable (e.g., temporarily enable) fast charging of the battery. For example, the body control module may increase the charging voltage to the battery for a period (e.g., may increase the charging voltage to the battery by 1-volt for ten minutes, etc.).

In some examples, responsive to the determination that the estimated next crank time qualifies as a failed crank or a slow crank, the body control module may cause a display device of the vehicle to display a warning message and/or a reminder message informing the driver of a likelihood of a slow crank or a failed crank at the next cold crank. For example, while the vehicle is in an engine-running state and the driver is occupying the vehicle (but not driving the vehicle), the body control module may display a warning message via, for example, an infotainment head unit of the vehicle, that indicates that there is a likelihood of a failed crank or a slow crank at the next cold crank. The warning message may also include suggested actions that the driver can take to reduce the likelihood of a failed crank or slow crank at the next cold crank. For example, the warning message may request the driver to keep the vehicle in the engine-running state for a period (e.g., ten minutes, fifteen minutes, etc.) after their drive is complete. In some examples, the warning message may request the driver to start the engine (e.g., via a remote start feature of vehicle) to charge the battery. In some examples, the body control module may cause an audio device of the vehicle to provide the warning message and/or the reminder message.

In some examples, the body control module may communicate the warning message and/or the reminder message to a remote device associated with the driver. For example, the body control module may communicate the warning message and/or the reminder message to a smart phone registered with the driver. In some such examples, the body control module may first upload the warning message and/or the reminder message to a network cloud, which then facilitates transmitting the warning message and/or the reminder message to the remote device associated with the driver. In some examples, the body control module may transmit the warning message and/or the reminder message to the remote device associated with the driver via a communication network (e.g., a wireless network, a wired network, etc.).

In general, it is more efficient to charge the battery of the vehicle while the temperature of the battery is warm (or hot) compared to when the temperature of the battery is cold. Thus, examples disclosed herein facilitate estimating when a next crank is likely to result in a failed crank or a slow crank (e.g., based on an estimated next crank time) and facilitate reducing the likelihood of the failed crank or slow crank by, for example, increasing the state of charge of the battery by charging the battery after a drive while the battery is warm (or hot).

Figure 1:
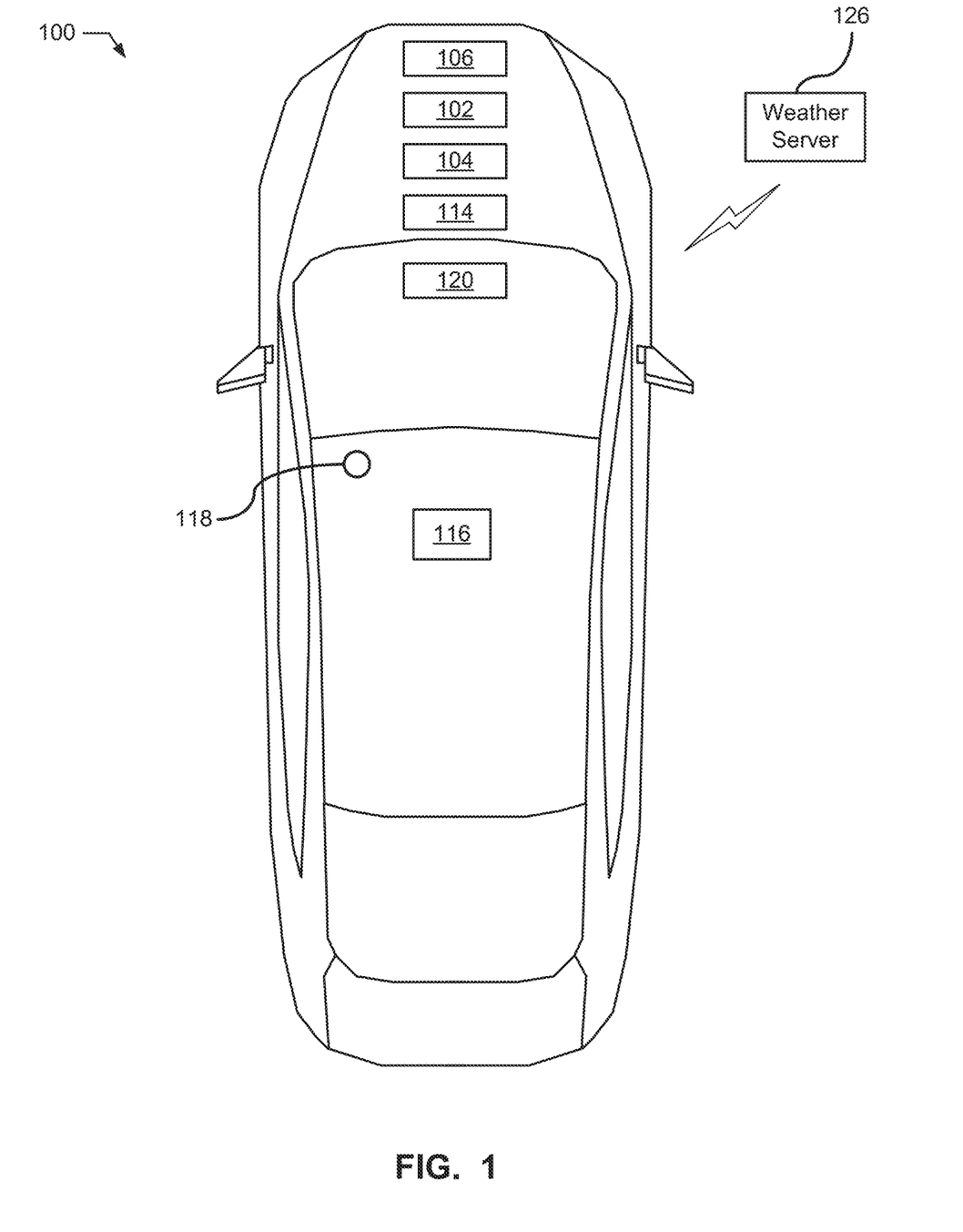
FIG. 1 illustrates an example vehicle in accordance with the teachings herein.

Turning to the figures, FIG. 1 illustrates an example vehicle 100 in accordance with the teachings herein. The vehicle 100 may be a standard gasoline powered vehicle, a hybrid vehicle, an electric vehicle, a fuel cell vehicle, and/or any other mobility implement type of vehicle. The vehicle 100 includes parts related to mobility, such as a powertrain with an engine, a transmission, a suspension, a driveshaft, and/or wheels, etc. The vehicle 100 may be non-autonomous, semi-autonomous (e.g., some routine motive functions controlled by the vehicle 100), or autonomous (e.g., motive functions are controlled by the vehicle 100 without direct driver input).

In the illustrated example of FIG. 1, the vehicle 100 includes an engine 102 and a battery 104. The engine 102 includes an internal combustion engine, an electric motor (sometimes referred to as an "engine starter motor"), and/or any other power source that propels movement of the vehicle 100.

The battery 104 may be any battery suitable for use in the vehicle 100. For example, the battery 104 may be a 12-volt lead-acid battery. The battery 104 may also have one or more corresponding characteristics that may be measured and/or calculated, such as a maximum capacity, a state of charge (SOC), temperature, voltage, current, etc.

In some examples, the battery 104 is a starter battery that provides energy to a starter motor of the vehicle to crank the internal combustion engine. Once the engine 102 is activated, electrical power is supplied to the vehicle 100 via an alternator. For example, the alternator may charge the battery 104 via a charging voltage. In some examples, the battery 104 is electrically connected to an electric motor of the engine 102 and provides electricity to the electric motor to enable the electric motor to propel the vehicle 100. In some such examples, the battery 104 may include a single battery cell and/or a battery pack that includes a plurality of battery cells connected together. For example, a lead-acid battery is typically a single battery that includes a plurality of battery cells connected together (e.g., six battery cells). In some examples, the battery 104 is electrically rechargeable via, for example, a power source (e.g., an external charger connected to, for example, a wall outlet, or a portable battery charger) that charges the battery 104 when connected (e.g., via a power connection).

The example vehicle 100 of FIG. 1 also includes an external temperature sensor 106 that measures the ambient temperature of the area around the vehicle 100. Alternatively or additionally, in some examples, the ambient temperature of the area around the vehicle 100 is provided by a weather server 126 via, for example, communication networks, such as cellular networks (e.g., Global System for Mobile Communications (GSM), Universal Mobile Telecommunications System (UMTS), Long Term Evolution (LTE), Code Division Multiple Access (CDMA), etc.), wide area networks (e.g., WiMAX (IEEE 802.16m), Wireless Gigabit (IEEE 802.11ad), etc.), local area wireless network (including IEEE 802.11 a/b/g/n/ac or others), personal area networks (e.g., Bluetooth®, Bluetooth® Low Energy, Z-Wave®, Zigbee®, etc.) and/or vehicle-to-vehicle networks (e.g., dedicated short range communication (DSRC), etc.), etc.

As illustrated in FIG. 1, the vehicle 100 also includes a battery sensor 114 (e.g., of a battery management system 202 of FIG. 2) that monitors characteristics of the battery 104. The battery sensor 114 detects and/or otherwise determines a current, a voltage, a charge level (e.g., a state of charge (SOC)), and/or a temperature of the battery 104. For example, the battery sensor 114 may detect that the current battery SOC is between 0% and 100% and the temperature of the battery 104 is between −40 (C) and 40 (C). In some examples, the battery sensor 114 is attached to a lead (e.g., a positive lead) of the battery 104 to enable the battery sensor 114 to monitor the characteristics of the battery 104.

Further, the vehicle 100 includes a body control module 116 and an ignition switch 118. The body control module 116 controls one or more subsystems throughout the vehicle 100, such as power windows, power locks, an immobilizer system, power mirrors, etc. For example, the body control module 116 includes circuits that drive one or more relays (e.g., to control wiper fluid, etc.), brushed direct current (DC) motors (e.g., to control power seats, power locks, power windows, wipers, etc.), stepper motors, light emitting diodes (LEDs), etc.

The body control module 116 of the illustrated example estimates potential failure of an engine cold crank based on an estimated crank time (e.g., duration) of a next cold crank. The example body control module 116 estimates the next cold crank time based on battery SOC information and temperature information. For example, the body control module 116 may periodically obtain battery SOC information of the battery 104 from the battery sensor 114. In some examples, the body control module 116 may estimate battery SOC information based on current battery SOC information. For example, the body control module 116 may estimate a 1% drop in battery SOC of the battery 104 every 24 hours due to, for example, average key-off-load current while the vehicle 100 is in a sleep state In such examples, the body control module 116 may estimate that after seven days, the battery SOC of the battery 104 will be 7% less than the current battery SOC. In some examples, the body control module 116 uses a default quantity (e.g., 7%) for a change in battery SOC while the vehicle 100 is in the sleep state over a period (e.g., seven days).

To estimate the potential failure of engine cold crank, the body control module 116 also uses temperature information. In some examples, the body control module 116 uses temperature information of the battery 104 collected and provided by the battery sensor 114. However, the temperature of the battery 104 is generally warmer while the engine is in the on state than after a period when the engine is in the off state. For example, the temperature of the battery 104 after a drive is likely to be warmer than the temperature of the battery 104 in the morning before a drive.

To improve reliability in estimating the potential failure of engine cold crank, the body control module 116 estimates the lowest temperature of the battery 104 for a cold crank. After an overnight soak, the temperature of the battery and the engine will be close to the ambient air temperature of the vehicle 100. In some examples, the body control module 116 obtains ambient air temperature from the temperature sensor 106. In some examples, the body control module 116 uses stored ambient air temperature information. For example, the body control module 116 may record (e.g., in memory 214 and/or memory 220 of FIG. 2) ambient air temperatures provided by the temperature sensor 106 for a rolling period (e.g., over the most recent 48 hour period, etc.). In some such examples, the body control module 116 may use the lowest temperature recorded within a threshold period (e.g., within the rolling period). In some examples, the body control module 116 obtains weather forecasts for a quantity of days. For example, the body control module 116 may obtain weather forecasts (e.g., from the weather server 126, from a weather radio channel, from a networked device, etc.) for the next seven days. In some such examples, the body control module 116 may use the lowest ambient air temperature predicted with a threshold period (e.g., within the next seven days). In some examples, the body control module 116 uses recorded ambient air temperatures when it is unable to obtain weather forecasts.

The example body control module 116 then estimates a next crank time (in milliseconds) based on the obtained battery SOC information and the obtained temperature information. In the illustrated example, the body control module 116 applies the battery SOC information and the temperature information to a table to estimate the next crank time. For example, the body control module 116 may use a data table (e.g., a data structure 300 of FIG. 3) to estimate the next crank time based on the obtained battery SOC information and the obtained temperature information. As discussed below in connection with the example data structure 300 of FIG. 3, the body control module 116 estimates the potential failure of engine cold crank based on the estimated crank time. For example, the body control module 116 may determine that there will be a failed cold crank, will be a slow cold crank (e.g., between 1000 milliseconds and 2000 milliseconds), or will be a fast cold crank (e.g., less than 1000 milliseconds).

In some examples, the body control module 116 compares the estimated next crank time to different thresholds to determine the potential failure of engine cold crank based on the estimated next crank time. For example, the body control module 116 may compare the estimated next crank time to a failure crank threshold (e.g., 2000 milliseconds). In some such examples, if the estimated next crank time does not satisfy the failure crank threshold (e.g., is greater than or equal to the failure crank threshold of 2000 milliseconds), then the body control module 116 determines that there a relatively high likelihood of potential failure of engine cold crank. If the estimated next crank time satisfies the failure crank threshold (e.g., is less than the failure crank threshold), then the body control module 116 may determine whether the estimated next crank time qualifies as a fast crank time or a slow crank time. For example, if the estimated next crank time satisfies a fast crank time (e.g., is less than 1000 milliseconds), then there is a relatively low likelihood of potential failure of engine cold crank and the estimated next crank time qualifies as a fast crank time. If the estimate next crank time does not satisfy the fast crank time (e.g., is less than 2000 milliseconds but more than 1000 milliseconds), then the body control module 116 qualifies the estimated next crank time as a slow crank time.

In some examples, the body control module 116 may set and/or reset a status flag based on the estimated next crank time. For example, if the estimated next crank time satisfies the fast crank time threshold (e.g., is less than 1000 milliseconds), the body control module 116 may set a low crank capability flag to False to indicate that there is not a likelihood of potential failure of the engine cold crank.

Responsive to determining that there is a potential failure of engine cold crank at the time of the next cold crank (e.g., the estimated next crank time did not satisfy the failure crank threshold), the body control module 116 disable certain features of the vehicle 100 that use battery power and adjusts the charging voltage of the battery 104 to enable fast charging of the battery 104. For example, the body control module 116 may adjust (e.g., increase) the charging voltage to the battery 104 by (or around) 1.0 volts so that the battery 104 charges (or recharges) relatively fast than if the charging voltage remained the same (e.g., was not adjusted). However, it should be appreciated that the body control module 116 may use other adjustments to the charging voltage. In some examples, the body control module 104 maintains the adjusted charging voltage for a threshold period. For example, the body control module 104 may increase the charging voltage to the battery 104 for ten minutes and then resume the normal charging voltage. By limiting the duration of the adjusted charging voltage, the body control module 116 may reduce the negative impact that the higher charging voltage may have on the life of the battery 104. For example, the higher charging voltage may result in a high-gassing rate of the battery, which could reduce the lift of the battery 104.

The body control module 116 may also disable some features of the vehicle 100 that use power from the battery 104. For example, the body control module 116 may disable a start-stop mode of the engine 102 and may disable a Smart-Regen-Charging (SRC) mode of the vehicle 100. However, it should be appreciated that to preserve the charge level of the battery 104, the body control module 116 may disable additional or alternative features of the vehicle 100 such as, for example, a heated seats feature, a heated windows feature, etc. By disabling features of the vehicle 100 that draw electrical power from the battery, battery drain is reduced and the battery 104 may charge (or recharge) relatively faster. As used herein, the term "load shedding" is used to refer to the disabling of features of the vehicle 100 that draw electrical power from the battery 104.

The body control module 116 also provides a warning to the driver when the body control module 116 determines that the estimated next crank time qualifies as a failed crank or a slow crank. For example, the body control module 116 may cause a display of the vehicle 100 (e.g., an example display 120 of the infotainment head unit 204 of FIG. 2) to display a message to the driver indicating the low crank capability of the battery 104. The body control module 116 may additionally or alternatively cause the display to include actions that the driver may take to recharge the battery 104. For example, the body control module 116 may request the driver to leave the vehicle 100 in an engine-running state for a period (e.g., ten minutes) at the end of their drive (e.g., by sitting in the vehicle for the period or via an auto shut-off feature of the vehicle that transitions the vehicle 100 to the off state after the period, etc.), may request the driver use a remote engine start feature of the vehicle 100 after (e.g., immediately after) the driver leaves the vehicle 100, may request the driver use an external power source (e.g., an external charger connected to a wall outlet, a portable battery charger, etc.) to recharge the battery 104, etc. In some examples, the body control module 116 may determine which battery recharging steps the driver should take based on location and/or positioning of the vehicle 100. For example, based on proximity sensors, the body control module 116 may determine that the vehicle 100 is in an enclosed area (e.g., a garage). In some such examples, the body control module 116 may not request that the driver utilize the remote engine start feature of the vehicle 100. In some examples, the body control module 116 may present the warning to the driver via a mobile device of the driver, such as a smart phone, a smart watch, a wearable, a tablet, etc.

In some examples, the body control module 116 presents the warning to the driver when the vehicle 100 is in an appropriate state. For example, if the body control module 116 determines that the driver is driving the vehicle 100, then the body control module 116 may wait until the driver stops the vehicle 100. For example, the body control module 116 may receive transmission state information and wait for the vehicle 100 to be in a park state before providing the warning to the driver. In some examples, the body control module 116 may wait for the vehicle 100 to be in an engine-running state but not driving. For example, the body control module 116 may receive information, from the ignition switch 118, that the key is in the ignition switch 118, but that the engine 102 is in the off state. In such instances, the driver is in the vehicle 100, but the car is not moving. In some examples, the body control module 116 may wait to provide the warning to the driver until the low crank capability flag is set to True. For example, the body control module 116 may set the low crank capability flag to True when the vehicle 100 is in an engine-running state but not in a driving mode.

In the illustrated example, when the body control module 116 determines that the engine 102 is in an on state and the low crank capability flag is set to True, the body control module 116 monitors the status of the battery 104 to determine if a flag resetting event occurred. For example, the body control module 116 may determine that the engine 102 has been in an on state for a threshold period (e.g., at least ten minutes). In some examples, the body control module 116 may determine that the vehicle is moving at a threshold speed (e.g., at least 3 kilometers per hour). In some examples, the body control module 116 may determine that the estimated next crank time satisfies a normal crank threshold (e.g., is less than the normal crank threshold of 1000 milliseconds). If the body control module 116 detects a flat resetting event, then the body control module 116 resets the low crank capability flag to False.

Figure 2:
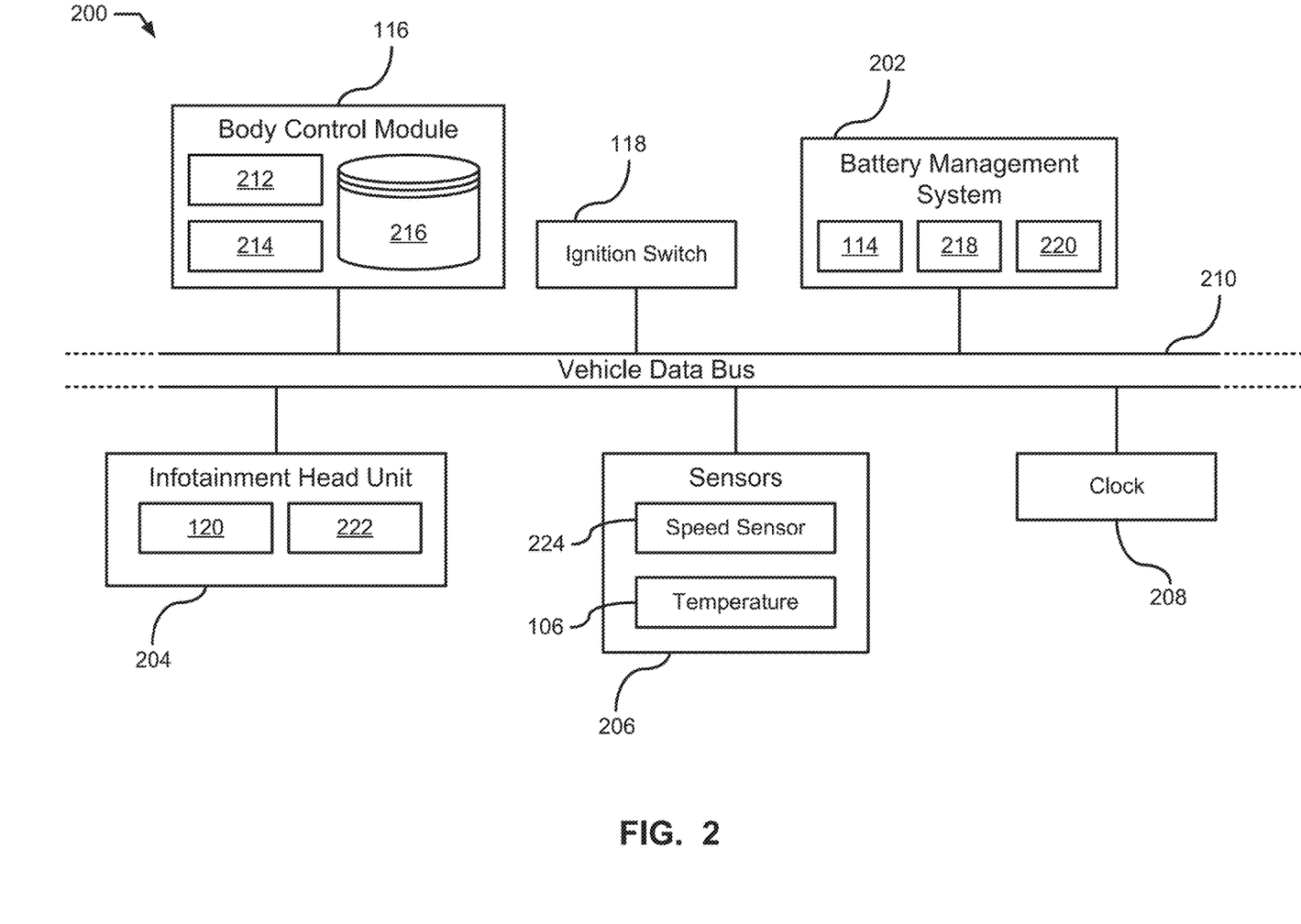
FIG. 2 is a block diagram of electronic components of the vehicle of FIG. 1.

FIG. 2 is a block diagram of electronic components 200 of the vehicle 100. As illustrated in FIG. 2, the electronic components 200 include the body control module 116, the ignition switch 118, a battery management system 202, an infotainment head unit 204, sensors 206, a clock 208 and a vehicle data bus 210.

The body control module 116 includes a microcontroller unit, controller or processor 212, memory 214, and a database 216. The example database 216 of FIG. 2 includes a data structure 300 of FIG. 3 that may be used by the body control module 116 to estimate the next crank time.

The processor 212 may be any suitable processing device or set of processing devices such as, but not limited to, a microprocessor, a microcontroller-based platform, an integrated circuit, one or more field programmable gate arrays (FPGAs), and/or one or more application-specific integrated circuits (ASICs). The memory 214 may be volatile memory (e.g., RAM including non-volatile RAM, magnetic RAM, ferroelectric RAM, etc.), non-volatile memory (e.g., disk memory, FLASH memory, EPROMs, EEPROMs, memristor-based non-volatile solid-state memory, etc.), unalterable memory (e.g., EPROMs), read-only memory, and/or high-capacity storage devices (e.g., hard drives, solid state drives, etc.). In some examples, the memory 214 includes multiple kinds of memory, particularly volatile memory and non-volatile memory.

The memory 214 is computer readable media on which one or more sets of instructions, such as software for operating the methods of the present disclosure, can be embedded. The instructions may embody one or more of the methods or logic as described herein. For example, the instructions reside completely, or at least partially, within any one or more of the memory 214, the computer readable medium, and/or within the processor 212 during execution of the instructions.

The terms "non-transitory computer-readable medium" and "computer-readable medium" include a single medium or multiple media, such as a centralized or distributed database, and/or associated caches and servers that store one or more sets of instructions. Further, the terms "non-transitory computer-readable medium" and "computer-readable medium" include any tangible medium that is capable of storing, encoding or carrying a set of instructions for execution by a processor or that cause a system to perform any one or more of the methods or operations disclosed herein. As used herein, the term "computer readable medium" is expressly defined to include any type of computer readable storage device and/or storage disk and to exclude propagating signals.

The battery management system 202 includes a microcontroller unit, controller or processor 218, memory 220, and the battery sensor 114 that monitors characteristics (e.g., the current, the voltage, the charge level, the temperature, etc.) of the battery 104. The processor 218 may be any suitable processing device or set of processing devices such as, but not limited to, a microprocessor, a microcontroller-based platform, an integrated circuit, one or more field programmable gate arrays (FPGAs), and/or one or more application-specific integrated circuits (ASICs). The memory 220 may be volatile memory (e.g., RAM including non-volatile RAM, magnetic RAM, ferroelectric RAM, etc.), non-volatile memory (e.g., disk memory, FLASH memory, EPROMs, EEPROMs, memristor-based non-volatile solid-state memory, etc.), unalterable memory (e.g., EPROMs), read-only memory, and/or high-capacity storage devices (e.g., hard drives, solid state drives, etc.). In some examples, the memory 220 includes multiple kinds of memory, particularly volatile memory and non-volatile memory.

The memory 220 is computer readable media on which one or more sets of instructions, such as software for operating the methods of the present disclosure, can be embedded. The instructions may embody one or more of the methods or logic as described herein. For example, the instructions reside completely, or at least partially, within any one or more of the memory 220, the computer readable medium, and/or within the processor 218 during execution of the instructions.

The body control module 116 and the battery management system 202 are electronic control units (ECUs) of the vehicle 100. ECUs (e.g., the body control module 116, the battery management system 202, etc.) monitor and control subsystems of the vehicle 100. For example, the ECUs are discrete sets of electronics that include their own circuit(s) (e.g., integrated circuits, microprocessors, memory, storage, etc.) and firmware, sensors, actuators, and/or mounting hardware. However, it should be appreciated that one or more ECUs may be combined to provide functionality. For example, the body control module 116 may be implemented using an ECU or a plurality of ECUs. The ECUs communicate and exchange information via a vehicle data bus (e.g., the vehicle data bus 210). Additionally, the ECUs may communicate properties (e.g., status of the ECUs, sensor readings, control state, error and diagnostic codes, etc.) to and/or receive requests from each other. For example, the vehicle 100 may have seventy or more of the ECUs that are positioned in various locations around the vehicle 100 and are communicatively coupled to the vehicle data bus 210.

The infotainment head unit 204 provides an interface between the vehicle 100 and the user. The infotainment head unit 204 includes digital and/or analog interfaces (e.g., input devices and output devices) to receive input from and display information for the user(s). The input devices include, for example, a control knob, an instrument panel, a digital camera for image capture and/or visual command recognition, a touch screen, an audio input device (e.g., cabin microphone), buttons, or a touchpad. The output devices may include actuators, the display 120 (e.g., a cluster output, a heads-up display, a center console display such as a liquid crystal display (LCD), an organic light emitting diode (OLED) display, a flat panel display, a solid state display, etc.), and/or speakers 222. For example, the infotainment head unit 204 includes hardware (e.g., a processor or controller, memory, storage, etc.) and software (e.g., an operating system, etc.) for an infotainment system (such as SYNC® and MyFord Touch® by Ford®). Additionally, the infotainment head unit 204 displays the infotainment system on, for example, a center console display.

The sensors 206 are arranged in and around the vehicle 100 to monitor properties of the vehicle 100 and/or an environment in which the vehicle 100 is located. One or more of the sensors 206 may be mounted to measure properties around an exterior of the vehicle 100. Additionally or alternatively, one or more of the sensors 206 may be mounted inside a cabin of the vehicle 100 or in a body of the vehicle 100 (e.g., an engine compartment, wheel wells, etc.) to measure properties in an interior of the vehicle 100. For example, the sensors 206 include accelerometers, odometers, tachometers, pitch and yaw sensors, wheel speed sensors, microphones, tire pressure sensors, biometric sensors, cameras, and/or sensors of any other suitable type.

In the illustrated example, the sensors 206 include speed sensors 224 and the external temperature sensor 106. The example speed sensors 224 are configured to determine a speed at which the vehicle 100 is moving. The example external temperature sensor 106 detects ambient air temperature around the vehicle 100.

In the illustrated example, the ignition switch 118 is monitored by the body control module 116 to detect when the ignition switch is in the off-position. Further, the clock 208 monitors time, for example, to enable the body control module 116 to determine a duration during which the vehicle has been in a sleep mode, a duration that the charging voltage to the battery 104 has been adjusted, etc.

The vehicle data bus 210 communicatively couples the body control module 116, the ignition switch 118, the battery management system 202, the infotainment head unit 204, the sensors 206, and the clock 208. In some examples, the vehicle data bus 210 includes one or more data buses. The vehicle data bus 210 may be implemented in accordance with a controller area network (CAN) bus protocol as defined by International Standards Organization (ISO) 11898-1, a Media Oriented Systems Transport (MOST) bus protocol, a CAN flexible data (CAN-FD) bus protocol (ISO 11898-7) and/a K-line bus protocol (ISO 9141 and ISO 14230-1), and/or an Ethernet™ bus protocol IEEE 802.3 (2002 onwards), etc.

Figure 3:
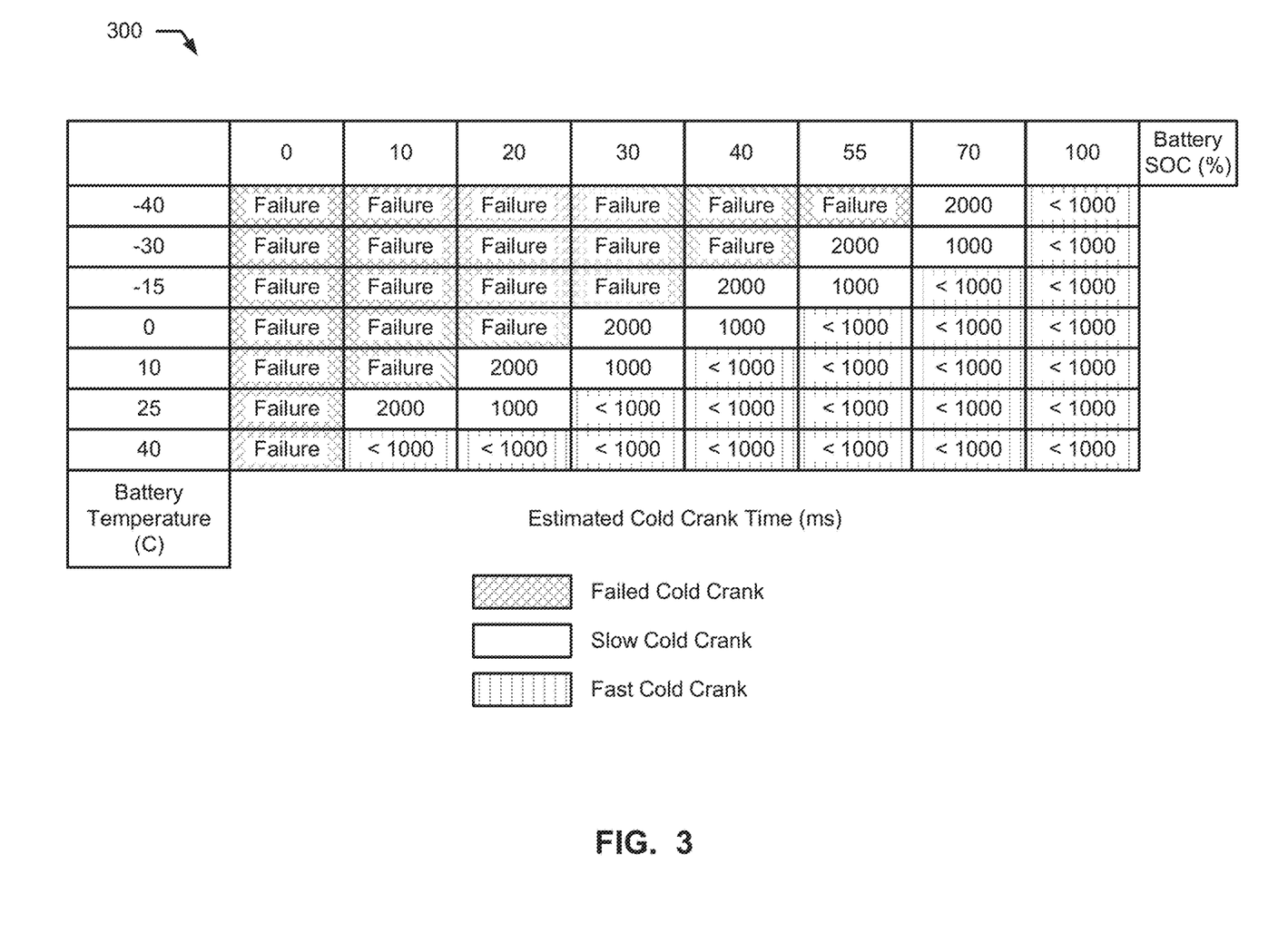
FIG. 3 is an example data structure that may be stored by the example body control module of FIG. 1 and/or FIG. 2 to facilitate estimating a next crank time.

FIG. 3 is an example data structure 300 that may be stored by the example body control module 116 of FIG. 1 and/or FIG. 2 to facilitate estimating a next crank time of the battery 104. The example data structure 300 uses battery SOC information and battery temperature information to estimate a next crank time of the battery 104. For example, the battery control module 116 may obtain current battery SOC information from the battery sensor 114, from a value recorded in memory, based on the current battery SOC, etc. The battery control module 116 may obtain temperature information from the battery sensor 114, from the temperature sensor 106, from a value stored in memory, from a weather forecast (e.g., from the weather server 126), etc.

In the illustrated example, the data structure 300 relates battery SOC (%) and battery temperature (Celsius (C)) to an estimated next cold crank time (milliseconds). For example, if the battery SOC is at 0%, then the battery 104 is expected to fail during the next cold crank. In contrast, if the battery SOC is at 100%, then the battery 104 is expected to have a fast cold crank (e.g., in less than 1000 milliseconds). As shown in the data structure 300, based on the battery SOC information and the battery temperature information, the body control module 116 is able to estimate whether the next cold crank will be a failed cold crank, will be a slow cold crank (e.g., between 1000 milliseconds and 2000 milliseconds), or will be a fast cold crank (e.g., less than 1000 milliseconds).

In some examples, the body control module 116 may update the data stored in the data structure 300. For example, the body control module 116 may record actual next crank times, along with actual SOC information of the battery 104 and actual temperature information, in the data structure 300. In some examples, the body control module 116 may process the new data prior to updating the data structure 300. For example, the data structure 300 may first be initiated at, for example, an assembly plant and include a plurality of data points based on lab data.

When the body control module 116 identifies a new data point (e.g., actual SOC information, actual temperature information, and an actual cold crank time) based on vehicle operations, the body control module 116 may weight or average the data (e.g., the cranking results) included in the new data point. In this manner, the body control module 116 prevents updating the data structure 300 based on an outlier data point. By updating the data structure 300 with actual cranking results (e.g., actual SOC information, actual temperature information, and an actual cold crank time), the body control module 116 is able to take advantage of identifying changes in the state of the battery 104. For example, the actual crank times may slow or fail even when the battery SOC information and the temperature information indicate that a fast crank time was estimated for a healthy (or new) battery due to, for example, an aged battery 104, an aged starter motor, aged electrical harness or joints, etc.

Figure 4:
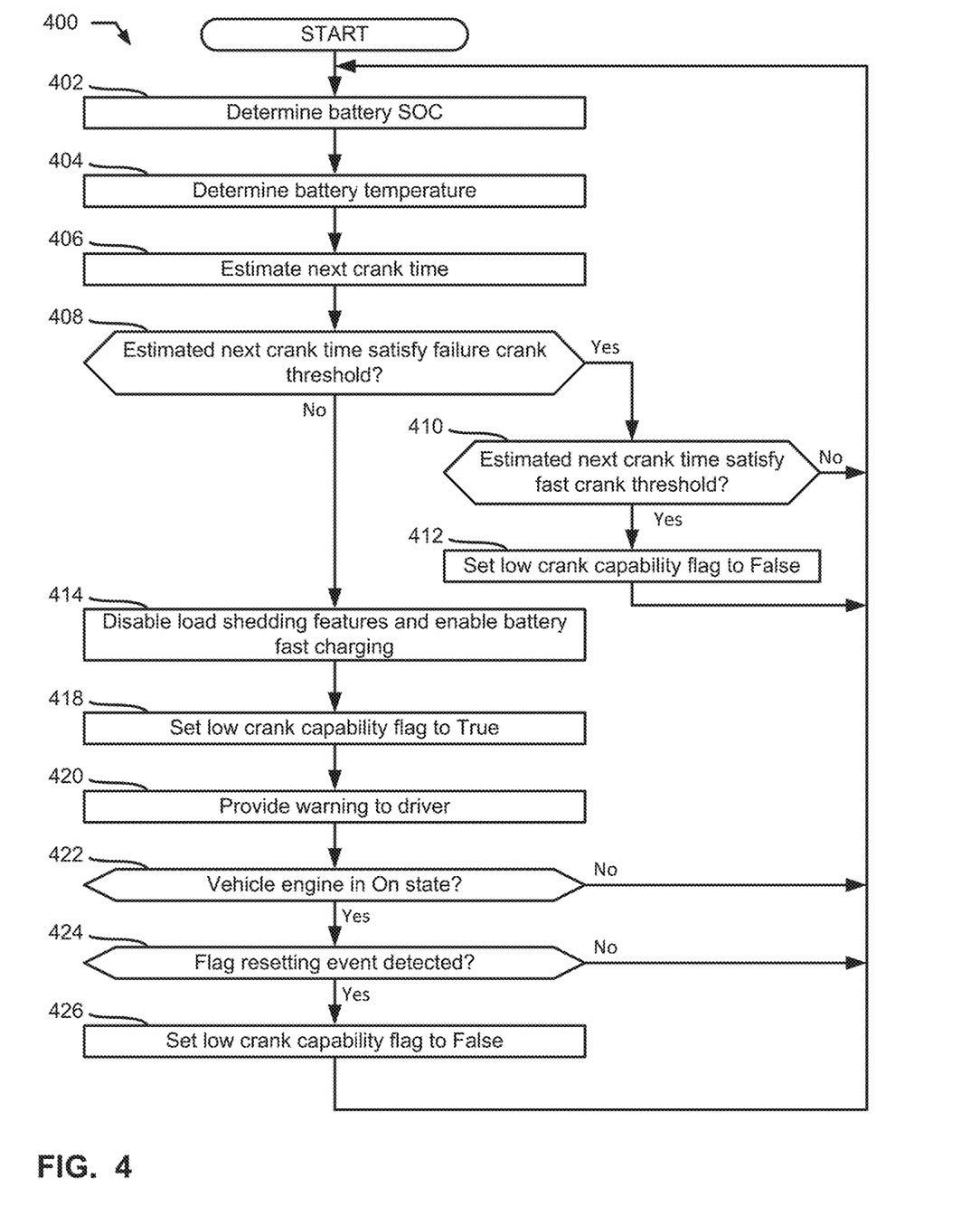
FIG. 4 is a flowchart for protecting against cold crank failure with respect to the vehicle of FIG. 1 in accordance with the teachings herein.

FIG. 4 is a flowchart of an example method 400 to facilitate protecting against cold crank failure. The flowchart of FIG. 4 is representative of machine readable instructions that are stored in memory (such as the example memory 214 and/or the example memory 220 of FIG. 2) and include one or more programs that, when executed (e.g., by a processor such as the example processor 212 and/or the example processor 218 of FIG. 2) cause the vehicle 100 to implement the example body control module 116 of FIG. 1 and/or FIG. 2, and/or the example battery management system 202 of FIG. 2. While the example program is described with reference to the flowchart illustrated in FIG. 4, many other methods of implementing the example body control module 116 and/or the example battery management system 202 may alternatively be used. For example, the order of execution of the blocks may be rearranged, changed, eliminated, and/or combined to perform the method 400. Further, because the method 400 is disclosed in connection with the components of FIG. 1, FIG. 2 and/or FIG. 3, some functions of those components will not be described in detail below.

The example method 400 of FIG. 4 begins at block 402 when the example body control module 116 determines the battery state of charge (SOC) of the battery 104. For example, the body control module 116 may obtain the battery SOC from the example battery sensor 114. In some examples, the body control module 116 determines the battery SOC based on a current battery SOC and an estimated change in battery SOC over a period of time (e.g., seven days). At block 404, the body control module 116 determines the temperature of the battery 104 at a next cold crank. For example, the body control module 116 may obtain a temperature of the battery 104 from the battery sensor 114 at the current time, may obtain ambient air temperature information from the temperature sensor 106, may determine the lowest ambient air temperature within a threshold quantity of days (e.g., the lowest ambient air temperature stored within the memory 214 and/or the memory 220 during the last two days, etc.), may obtain the lowest ambient air temperature predicted within the next threshold quantity of days (e.g., may obtain weather forecasts based on a location of the vehicle 100 over the next seven days, etc.), etc.

At block 406, the body control module 116 estimates a next crank time (e.g., duration) based on the battery SOC, the battery temperature and a data table. For example, the body control module 116 may apply the battery SOC and the battery temperature to the example data structure 300 of FIG. 3 to estimate the next crank time in milliseconds. At block 408, the body control module 116 determines whether the estimated next crank time satisfies a slow crank threshold (e.g., is less than a slow crank threshold). For example, the body control module 116 may compare the estimated next crank time to a slow crank threshold of 2000 milliseconds.

If, at block 408, the body control module 116 determines that the estimated next crank time satisfies the slow crank threshold (e.g., is less than the slow crank threshold of 2000 milliseconds), then, at block 410, the body control module 116 determines whether the estimated next crank time satisfies a fast crank threshold (e.g., is less than a fast crank threshold). For example, the body control module 116 may compare the estimated next crank time to a fast crank threshold of 1000 milliseconds.

If, at block 410, the body control module 116 determines that the estimated next crank time does not satisfy the fast crank threshold (e.g., is greater than or equal to the fast crank threshold of 1000 milliseconds), then the method 400 returns to block 402 to determine the battery SOC.

If, at block 410, the body control module 116 determines that the estimated next crank time satisfies the fast crank threshold (e.g., is less than the fast crank threshold of 1000 milliseconds), then, at block 412, the body control module 116 sets the status of the low crank capability to False. The method 400 then returns to block 402 to determine the battery SOC.

Returning to block 408, if the body control module 116 determines that the estimated next crank time does not satisfy the slow crank threshold (e.g., is greater than or equal to the slow crank threshold of 2000 milliseconds), then, at block 414, the body control module 116 disables load shedding features of the vehicle 100 and enables battery fast charging. For example, the body control module 116 may disable smart regen charging (SRC) and/or may disable auto start-stop function. However, it should be appreciated that other features that use power from the battery 102 may additionally or alternatively by disabled. The body control module 116 may also adjust (e.g., increase) the charging voltage to the battery 104 for fast charging of the battery 104 to facilitate avoiding potential failure during the next cold crank. For example, the body control module 116 may increase the charging voltage to the battery 104 by one volt (1.0 V). In the illustrated example, the body control module 116 increases the charging voltage to the battery 104 for a predetermined duration (e.g., 10 minutes) to avoid damaging the battery 104.

At block 418, the body control module 116 sets the low crank capability flag to True. At block 420, the body control module 116 provides a warning to the driver regarding the low battery level. For example, the body control module 116 may cause the display 120 to display a message stating that the "Battery Level is Low—Keep engine running for 10 more minutes or start engine remotely after exiting the vehicle." However, it should be appreciated that other messages informing the driver of the low battery level and any actions to take may additionally or alternatively be used. For example, the body control module 116 may cause the display 120 to display a message informing the driver to use a battery charger to increase the battery SOC. In the illustrated example, the body control module 116 provides the message to the driver while the driver is still in the vehicle 100. Thus, the body control module 116 is able to take advantage of the relatively faster charging times of the battery 104 while the battery 104 is relatively warm. In some examples, the body control module 116 may provide the message via an audio device (e.g., speakers) of the vehicle 100.

At block 422, the body control module 116 determines whether the engine 102 is in an on state. If, at block 422, the body control module 116 determines that the engine 102 is not in the on state (e.g., is in the off state), then the method 400 returns to block 402 to determine the battery SOC.

If, at block 422, the body control module 116 determines that the engine 102 is in the on state, then, at block 424, the body control module 116 determines whether a flag resetting event occurred. For example, the body control module 116 may determine whether the engine 102 has been in an on state for a threshold period (e.g., at least ten minutes), may determine whether the vehicle is moving at a threshold speed (e.g., at least 3 kilometers per hour), and/or may determine whether the estimated next crank time satisfies a normal crank threshold (e.g., is less than the normal crank threshold of 1000 milliseconds). If, at block 424, the body control module 116 does not detect a flag resetting event, then the method 400 returns to block 402 to determine the battery SOC.

If, at block 424, the body control module 116 detects a flag resetting event, then, at block 426, the body control module 116 sets the status of the low crank capability to False. The method 400 then returns to block 402 to determine the battery SOC.

It should be appreciated that the example method 400 of FIG. 4 is continuously (e.g., repeatedly) executed by the vehicle 100. For example, the vehicle 100 may execute the method 400 of FIG. 4 each time a crank of the engine 100 is attempted, may execute the method 400 periodically (e.g., every 100 milliseconds, every second, every five minutes, etc.), etc. By continuously (or nearly continuously) executing the example method 400 of FIG. 4, the parameters of the vehicle may be continuously (or nearly continuously) updated. For example, the battery SOC information and the battery temperature information is continuously (or nearly continuously) updated.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or." The terms "includes," "including," and "include" are inclusive and have the same scope as "comprises," "comprising," and "comprise" respectively.

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

What is claimed is:

1. A vehicle comprising:
    a battery; and
    an electronic control unit (ECU) configured to:
        obtain state of charge information of the battery;
        obtain temperature information; and
        estimate a next crank time of an engine of the vehicle based on the state of charge information and the temperature information, the next crank time including a duration of time required to crank the engine successfully.

2. The vehicle of claim 1, wherein the electronic control unit (ECU) is further configured to estimate the next crank time by comparing the state of charge information and the temperature information to a data table.

3. The vehicle of claim 2, wherein the data table relates state of charge information and temperature information to an estimated next crank time.

4. The vehicle of claim 3, wherein the electronic control unit (ECU) is further configured to update the data table based on at least one of: a measured crank time of the vehicle, a measured battery SOC, or a measured battery temperature with cold engine condition.

5. The vehicle of claim 1, wherein the electronic control unit (ECU) is further configured to adjust the state of charge information based on an average key-off load measured in a prior parking event and an estimated vehicle park time.

6. The vehicle of claim 1, wherein the electronic control unit (ECU) is further configured to obtain the temperature information by:
Storing a plurality of vehicle ambient air temperatures measured by a vehicle ambient air temperature sensor over a threshold period; and
selecting one of the lowest stored ambient air temperatures of the plurality of vehicle ambient air temperatures.

7. The vehicle of claim 1, wherein the electronic control unit (ECU) is further configured to obtain the temperature information by:
obtaining weather forecasts for a threshold period;
identifying the lowest ambient air temperature included in the weather forecasts; and
selecting the lowest identified ambient air temperature included in the weather forecasts.

8. The vehicle of claim 1, wherein the electronic control unit (ECU) is further configured to compare the estimated next crank time to a fast threshold crank time and a failure threshold crank time, wherein the failure crank time threshold is longer than the fast crank time threshold.

9. The vehicle of claim 8, wherein the electronic control unit (ECU) is further configured to:
compare the estimated next crank time to a failure threshold crank time; and
responsive to a determination that the estimated next crank time is greater than the failure threshold crank time, qualify the estimated next crank time as a failed cold crank.

10. The vehicle of claim 9, wherein the electronic control unit (ECU) is further configured to
compare the estimated next crank time to a failure threshold;
determine that the estimated next crank time is equal to or less than the failure threshold;
compare the estimated next crank time to a fast crank threshold;
determine that the estimated next crank time is equal to or less than the fast crank threshold; and
qualify, based on the determination that the estimated next crank time is equal to or less than the fast crank threshold, the estimated next crank time as a fast cold crank.

11. The vehicle of claim 9, wherein the electronic control unit (ECU) is further configured to increase, based on the determination that the estimated next crank time is greater than the failure threshold, an alternator charging voltage to an increasing charging voltage for a threshold period of time.

12. The vehicle of claim 9, wherein the electronic control unit (ECU) is further configured to provide a message based on the determination that the estimated next crank time is greater than the failure threshold, the message indicating that there is a potential failure of engine cold crank at a next cold crank of the vehicle.

13. The vehicle of claim 12, wherein the electronic control unit (ECU) is further configured to provide the message via a display device of the vehicle, and wherein the ECU is further configured to send battery state of charge, temperature, cranking time, and battery internal resistance data recorded during a previous vehicle cranking event to a server.

14. The vehicle of claim 12, wherein the message further provides an indication to a user to keep the engine running for a threshold period of time to prevent a failed engine start at a next crank attempt.

15. The vehicle of claim 12, wherein the message further provides an indication to a user to remote start an engine to charge a battery of the vehicle and prevent a failed engine start at a next crank attempt.

16. The vehicle of claim 9, wherein the electronic control unit (ECU) is further configured to:
disable a vehicle Smart-Regen-Charging function and a vehicle engine automatic Start-Stop function and set a vehicle alternator voltage to be greater than one or more threshold values associated with the vehicle Smart-Regen-Charging function and a vehicle engine automatic Start-Stop function.

17. The vehicle of claim 1, wherein the electronic control unit (ECU) is further configured to:
receive an instruction to remotely start the engine of the vehicle; and
increase an ambient temperature of the vehicle by enabling an electric load of the vehicle including at least: a steering wheel, a heated seat, a heated mirror, or a window defroster, wherein increasing the ambient temperature of the vehicle increases a temperature of the battery for increased battery charging acceptance.

18. The vehicle of claim 1, wherein the electronic control unit (ECU) is at least one of: a body control module (BCM) in vehicle or a remote device.

19. A method for qualifying a next cold crank of a vehicle, the method comprising:
obtaining, from a battery sensor, state of charge information from a battery of the vehicle;
obtaining, by a processor, temperature information associated with the vehicle; and
estimating, by the processor, a next crank time of an engine of the vehicle based on the state of charge information and the temperature information, the next crank time including a duration of time required to crank the engine.

* * * * *